INVENTOR.
ROBERT F. NUGENT
BY
ATTORNEY

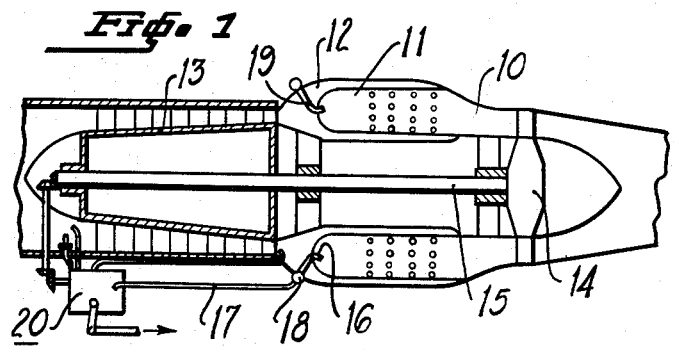
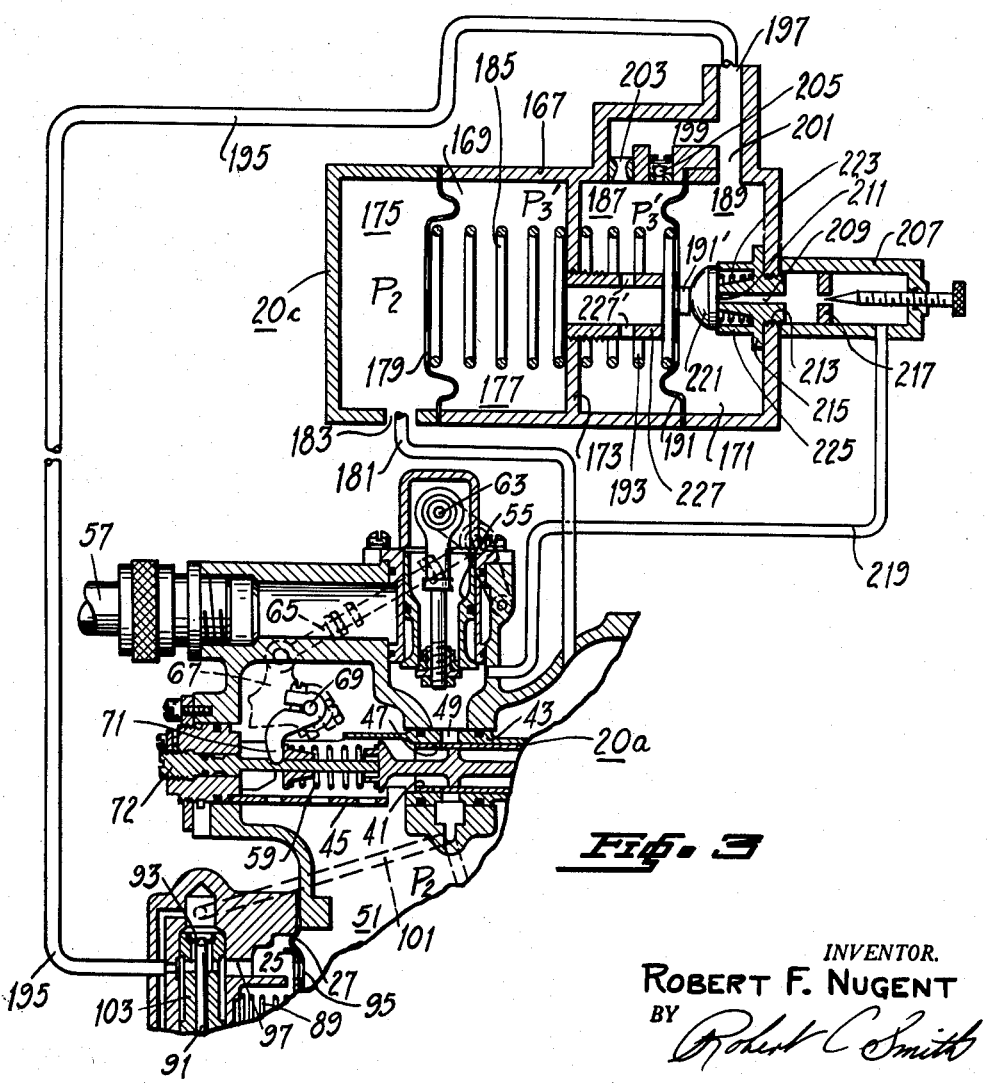
Fig. 1
Fig. 3
INVENTOR.
ROBERT F. NUGENT
BY Robert C. Smith
ATTORNEY

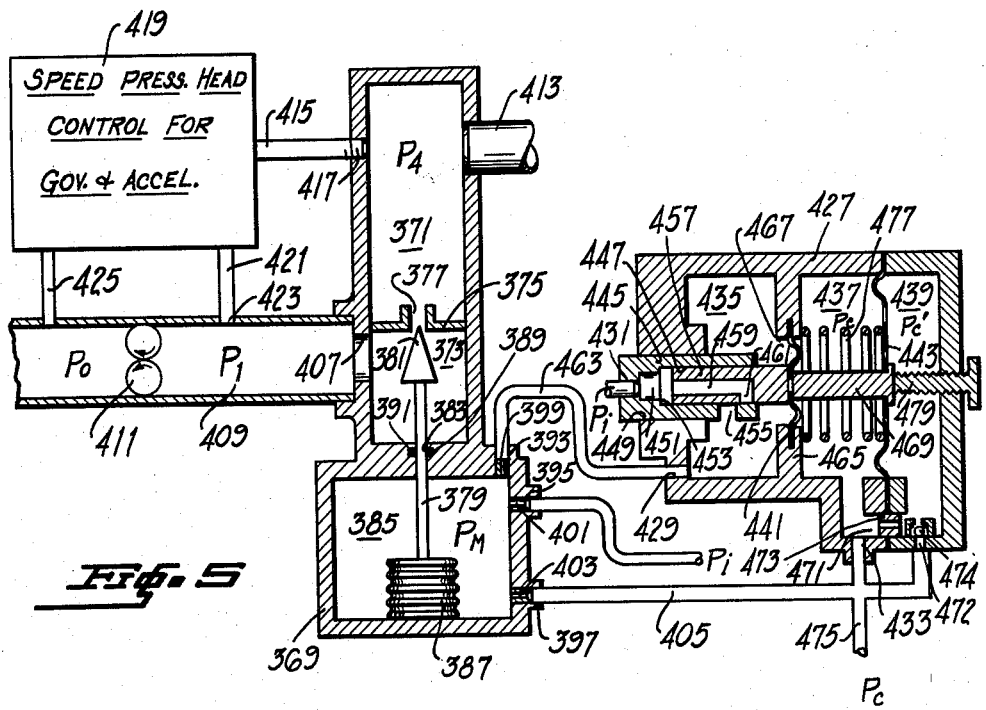

United States Patent Office

2,947,142
Patented Aug. 2, 1960

2,947,142

FUEL CONTROL SYSTEM FOR GAS TURBINE ENGINES

Robert F. Nugent, South Bend, Ind., assignor to Bendix Aviation Corporation, South Bend, Ind., a corporation of Delaware Filed Sept. 8, 1955, Ser. No. 533,112

16 Claims. (Cl. 60—39.28)

This invention relates to gas turbine engine fuel systems and in particular to a device for modifying the amount of metered fuel delivered to an aircraft gas turbine engine under certain conditions.

When a gas turbine engine is accelerated it is not only important that sufficient fuel shall be permitted to reach the engine, but it is also of importance that the quantity that can reach it does not exceed certain limits. If the fuel supply exceeds what is necessary to achieve the desired acceleration the result may be that the engine will suffer damage from overheating and that the air compressor may be subjected to surging or stalling.

The operation of military aircraft, especially fighter-type aircraft, is such that flight performance may often require a rapid manipulation of the throttle control from idle to maximum speed with subsequent immediate reaccelerations while the engine is still decelerating from maximum speed. In other words, the pilot, in order to place his aircraft in an advantageous position during combat, may wish to continuously reaccelerate his engine from an intermediate speed to maximum speed with very little elapse of time between subsequent power bursts. Under these conditions, high engine operating temperatures are encountered which do not become stabilized. Because of the high temperatures and the resulting expansion of metal parts, the operating clearances within the engine are very small and the areas through which fluid flow is directed will experience a change accordingly. One of the important aspects considered in the change of area is that of the stator. Since the compressor discharge pressure is controlled by the area established by the stator, a substantial high temperature will produce a concomitant change in available stator area exposed to fluid flow.

It has been found that, if an engine is accelerated from idle to maximum speed and held there for a short time before being decelerated, compressor stall will occur upon an immediate reacceleration to maximum speed. Figure 6 illustrates such an occurrence. It will be observed from the normal acceleration curve that the initial amount of scheduled fuel will be too rich for reaccelerations due to a shift of the normal stall region to lower fuel flow values. This shift of stall region is brought about by engine characteristics resulting from internal temperatures which, due to the fact that the engine has not reached a steady state operation, are high and unstabilized. Furthermore, the attempt to accelerate the engine is taking place during a decelerating engine condition, thereby imposing an additional factor relative to the shift of stall region. During the short interval of time in which the engine experiences a transition from deceleration to acceleration, the already high temperatures are aggravated further by the necessary expenditure of energy which is needed to overcome the inertia of the decelerating engine parts.

The above mentioned factors are reflected in a change in engine fuel demand as shown in Figure 6. Since the fuel flow as scheduled by the normal acceleration curve, shown in Figure 6, in the critical region of compressor stall is in excess of that dictated by actual engine requirements, a leaner fuel delivery is essential to avoid entry into stall conditions. It is to be understood that, although other variables, such as ambient temperature, may cause a displacement of the stall area, they are not immediately pertinent as far as the present problem is concerned.

Although the fuel metering control could be adjusted to give a leaner acceleration schedule during all acceleration runs, initial or subsequent to operation at maximum speed, such a modification would result in a definite increase in time required for initial accelerations to maximum speed. It is, therefore, apparent that a method of controlling the fuel flow is desired which will provide for the normal amount of fuel delivery to the engine during initial acceleration to maximum speed but, upon an immediate reacceleration, will also provide for a decrease in the amount of fuel below that of the initial acceleration in the region of compressor stall.

It is, therefore, an object of this invention to provide a device which will lean the basic acceleration fuel metering schedule on an immediate full throttle acceleration after decelerating from maximum speed thereby preventing an occurrence of compressor stall.

Another object of this invention is to provide a simple and compact device for rescheduling fuel flow to avoid compressor stall during repeated engine accelerations.

A further object of this invention is to provide a device which will avoid compressor stall during repeated engine accelerations and which may be easily adapted for operation with existing fuel metering controls.

Another object of this invention is to provide a device which may be adjusted to provide for any desired diminution of the normal fuel flow to an engine during certain periods of operation thereof, and which may also be adjusted to operate for any desired period of time before restoring the normal fuel flow depending upon engine temperature stabilization and response.

A still further object of this invention is to provide a fluid pressure sensing device which acts in response to relatively few fluid pressure variables in such a manner as to lean the basic acceleration fuel metering schedule at an occasion of immediate reacceleration subsequent to an initial acceleration to maximum speed.

A still further object of this invention is to provide a device which will permit a gas turbine engine to accelerate to a maximum engine speed from any given engine speed under all conditions without causing an occurrence of compressor stall and, at the same time, provide for a maximum rate of acceleration to maximum engine speed.

Additional objects and advantages of this invention will become apparent to those skilled in the art in view of the following description taken in conjunction with the drawings, wherein:

Figure 1 is a sectional view, with some parts thereof shown in elevation, of a gas turbine engine having operatively associated therewith a fuel control embodying the present invention;

Figure 3 is an enlarged sectional view of a modified form of the present invention shown with only that portion of the main control of Figure 2 necessary to indicate the manner of conduit interconnection;

Figure 2:
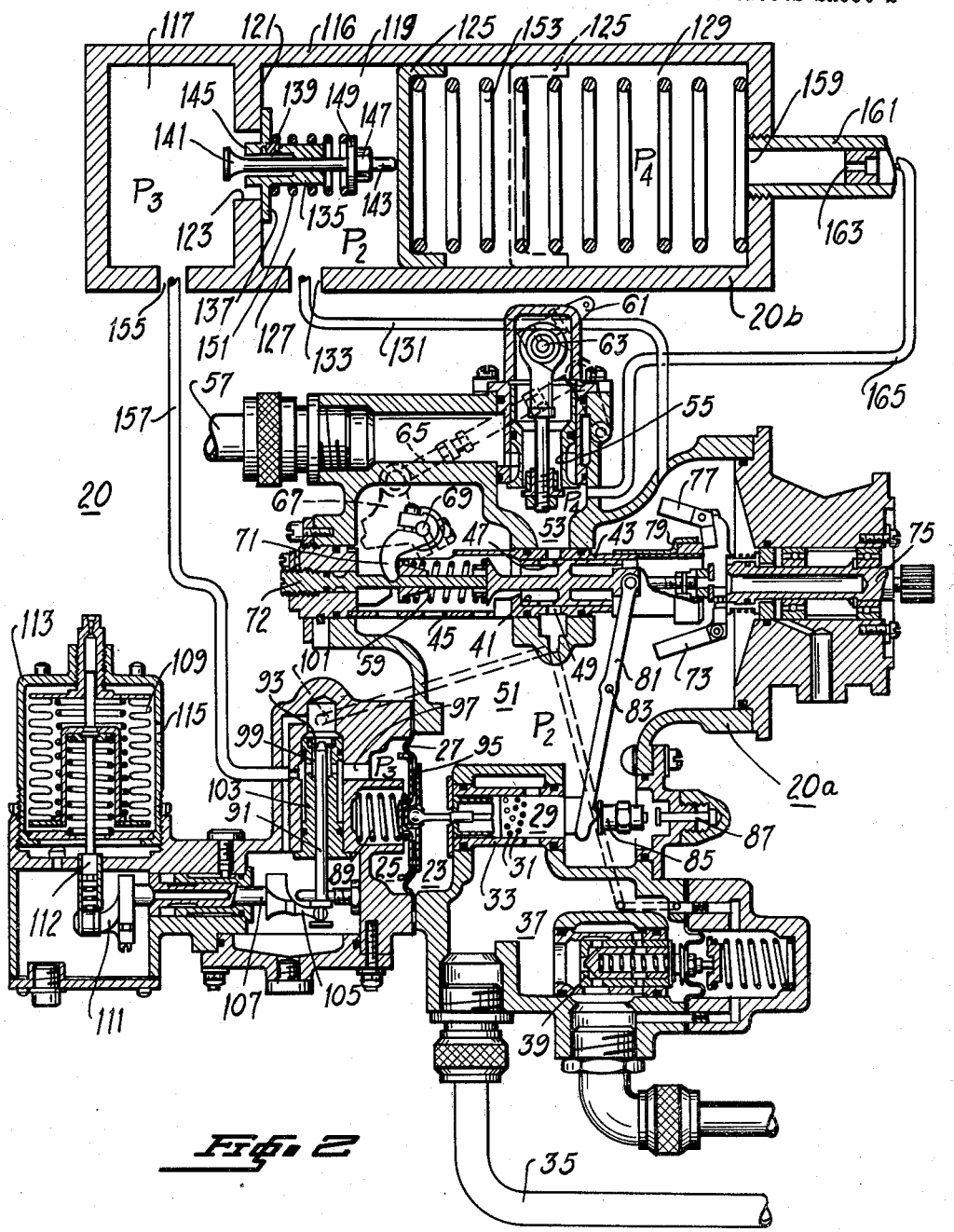
Figure 2 is a sectional view of the fuel control as shown in Figure 1 with the present invention removed from the main control and drawn in enlarged form.

Figure 5 is a sectional view of another fuel control as shown in Figure 1 with a modification of the present invention removed from the main control and drawn in enlarged form; and Figure 6 shows a series of curves having a fuel flow vs. control speed relationship and their relative positions in regards to a compressor stall area during a normal acceleration and a stall area existing during an acceleration from an unstabilized speed.

Referring to Figure 1, a gas turbine engine is generally indicated at numeral 10; it includes a series of combustion chambers 11, mounted in a casing having a header or air intake section 12. A dynamic compressor is indicated at 13; it is shown as one of the axial flow type, driven by means of a turbine 14 through a shaft 15. Each of the combustion chambers is provided with a burner nozzle 16, to which metered fuel is supplied under pressure by way of a conduit 17, fuel manifold 18 and individual fuel line 19. The conduit 17 receives metered fuel from a fuel control device generally indicated at 20 in Figure 1 and shown primarily in sectional schematic view in Figure 2 which will now be described.

Figure 2 shows a sectional view of a fuel control 20 including main fuel metering unit 20a and a flow rescheduling unit 20b. In main metering unit 20a are shown a pair of chambers 23 and 25 divided by a metering head diaphragm 27. A regulator valve 29, provided with a series of ports 31 is connected to the diaphragm 27. The regulator valve is hollow and slidable within a casing 33. Fuel is delivered to the regulator valve from a source, not shown, by way of a conduit 35, and a chamber 37. A fuel pump, not shown, supplies the fuel to chamber 37, said fuel being maintained at a predetermined pressure value through the action of a by-pass valve 39 which operates in the conventional manner, by-passing fuel to the inlet side of the pump when the pressure in chamber 37 exceeds said predetermined value. A throttle or governor valve 41 is slidably mounted in a valve body 43 having a hollow tubular section 45, the valve being provided with openings 47 adapted to register with coacting openings 49 in the valve body. Fuel at $P_2$ pressure in chamber 51 flows into the tubular extension 45 and thence through metering restrictions 47 and 49 to annular metered fuel chamber 53. From the latter chamber, fuel flows across a cut-off valve 55 and then by way of conduit 57 to conduit 17 of Figure 1.

The throttle valve 41 is of the all-speed governor type; it is provided with a governor spring 59 which may be selectively set by the pilot through suitable linkage including lever 61, shaft 63, adjustable rod or link 65, arm 67, shaft 69 and lever 71. When lever 61 is turned clockwise, the spring 59 is compressed and valve 41 is simultaneously moved in a direction to increase the area of the metering openings 47, 49. An adjustable stop 72 limits valve 41 to a minimum flow position when closed. The right hand end of the stem of valve 41 acts to reset a pair of governor weights 73 (only one of which is shown) mounted to rotate with an engine driven governor shaft 75. When the selected speed is reached, the governor weights balance the governor spring and an equilibrium condition is attained, whereupon the engine will operate at a substantially constant speed for the particular setting of the pilot's control lever.

The regulator valve 29 is positioned automatically as a function of engine speed and will maintain the fuel head across the throttle valve 41 within predetermined upper and lower limits of temperature. In the example illustrated this is accomplished by applying the thrust exerted by a pair of centrifugal weights 77 (only one of which is shown) to the regulator valve 29 and its coacting diaphragm 27. These weights 77 are mounted to rotate with the engine driven drive shaft 75 along with the all-speed governor weights 73. The weights 77, however, act independently of the weights 73. Thus, while the weights 73 act on the inner end of the stem of the throttle valve 41, the weights 77 act on a sliding sleeve 79 having a driving connection with the shaft 75, said sleeve in turn having an operating connection with the upper end of a lever 81, the latter being fulcrumed at 83 and at its lower end being forked and contacting a thrust bearing 85 mounted on the stem of the regulator valve 29. As the speed of the engine driven shaft 75 increases, the weights 77 move radially outward and exert a force on the regulator valve 29 in a direction tending to open the latter; this force is opposed, however, by fuel pressure acting on the diaphragm 27 in a direction tending to close said valve, the resultant differential being substantially proportional to the square of engine speed. This differential is proportional to that imposed across the throttle valve 41, and for any given position of the latter valve (assuming constant density) the velocity and hence the fuel flow across the metering restrictions 47, 49 will be proportional to the square root of this differential or to engine speed directly.

An adjustable stop 87 determines the maximum open position of the regulator valve 29, while a spring 89 acting on the diaphragm 27 determines the minimum metering head at engine speeds which may be so low as to produce instability in the regulator system.

Since the supply of air will not only vary with engine speed, but also with changes in density due to changes in pressure and temperature and aircraft speed (ram pressure), a density compensating circuit is provided. This consists of a contoured needle 91 which controls an orifice 93 in series with one or more fixed control restrictions 95, communicating chamber 51 with chamber 25 across the regulator diaphragm 27. From chamber 25, fuel may flow to the metered fuel ($P_4$ pressure) chamber 53 by way of passage 97, valve chamber 99, orifice 93 and passage 101. The density needle 91 is mounted to slide in a sealed bearing 103 and at its lower end has an operating connection with an arm or lever 105 secured on the adjacent end of a shaft 107, the opposite end of said shaft having an operating connection with a density responsive spring loaded capsule 109 by means of an arm or lever 111 and rod 112. The bellows or capsule 109 is mounted in a housing 113 vented at 115, the unit as a whole being located where it will be exposed to changes in pressure and temperature of the air flowing to the compressor.

The fuel regulator and its interrelated density compensating circuit operate as follows:

The fuel pressure differential across the regulator diaphragm 27 at a given governor setting and constant density is substantially equal to and balances the force set up by the centrifugal head generating weights 77; it is proportional to the square of engine speed and will vary with engine speed. If at a given engine speed the throttle or governor valve 41 is repositioned, the regulator valve 29 will also be repositioned due to the fact that the regulator differential will be out of balance with the differential across the throttle valve. As the governor valve 41 opens or closes to maintain the speed selected by the setting of the governor, the regulator valve 29 opens or closes to maintain the fuel head or pressure differential across the valve 41 in accordance with the particular speed at which the engine is operating.

The density control circuit or passageway consisting of the control restrictions 95, chamber 25, passage 97, valve chamber 99 and passage 101 is in parallel with the main flow passage across the throttle or governor valve by way of chambers 23, 51 and metering restrictions 47, 49. All flow through the density circuit must pass through the control restrictions 95 and variable orifice 93 controlled by needle 91. Since at a given engine speed the differential across the regulator diaphragm remains constant, the flow through the fixed restrictions 95 will also remain constant, and the drop across the variable orifice 93 at a constant flow will vary inversely as the square of its area, and for a given position of needle 91 (constant density) the drop across orifice 93 will be proportional to the drop across the restrictions 95. The sum of the drop across the orifice 93 and the drop across the restrictions 95 is equal to the drop across the throttle or governor valve 41, and at any fixed position of needle 91, the total drop will be substantially proportional to the square of engine speed.

Any variation in compressor inlet pressure and/or temperature will vary the position of the needle 91. Should there be a drop in entering air density, the bellows or capsule 109 will expand and move needle 91 downwardly, thereby increasing the area of orifice 93 and reducing the drop or pressure differential across said orifice. This increases the $P_2$—$P_3$ differential across the regulator diaphragm 27 at the then existing speed and throws the differential out of balance with the centrifugal head generating weights 77, whereupon the regulator valve 29 moves toward closed position and the rate of fuel feed and hence engine speed is reduced to a point where the differential is again in balance with the said weights. Should there be an increase in entering air density, the foregoing sequence of operations will be reversed. It will thus be seen that the density circuit senses the pressure differential across the governor valve in order to correct the position of the regulator valve for variations in compressor inlet air pressure and temperature. Also, at any given engine speed as determined by the setting of the governor, the position of the valve 41 will remain substantially constant irrespective of changes in entering air density, but fuel flow will still vary in relation to such changes due to variation in the fuel metering head.

For a more complete illustration and description of the device so far described and shown schematically in Figure 2, reference may be had to the copending application of Frank C. Mock, Serial No. 716,154 filed December 13, 1946, and assigned to the assignee of the present application, now abandoned.

The means whereby the normal acceleration fuel feed schedule is varied to obtain a leaner schedule at certain times, is shown in Figure 2 in enlarged section as unit 20b and removed from the remaining parts of the control. It comprises a casing 116 divided into chambers 117 and 119 by annular shoulder 121 having a central passage 123 therethrough. Piston 125 slidably secured in chamber 119 divides chamber 119 into variable volume chambers 127 and 129. A conduit 131 threadedly engaged with a port 133 opening into chamber 127 provides for communication from chamber 51 to chamber 127 at all times. An annular shaped valve guide 135 having a flange 137 around the outer portion near one end is centrally located in passage 123 and removably secured therein. Flange 137 contacts shoulder 121 in a sealed engagement with the major portion of valve guide 135 extending therefrom into chamber 127. A bleed 139 removably secured in the sidewall of valve guide 135 at the base of flange 137 communicates chamber 127 with chamber 117. A valve 141 having an elongated stem portion 143 slidably secured in valve guide 135 is adapted for engagement with valve seat 145 on valve guide 135. The valve stem 143 is threaded at one end and an adjustable nut 147 is threadedly engaged therewith to prevent a spring retaining washer 149 from slipping off the valve stem. A spring 151 interposed between flange 137 and spring retaining washer 149 acts to urge valve 141 towards valve seat 145. The piston 125 is caused to abut valve stem 143 under the influence of spring 153 interposed between piston 125 and casing 116. A port 155 through the sidewall of casing 116 opens into chamber 117 and a conduit 157 threadedly engaged with port 155 conducts fluid pressure between chamber 117 and chamber 99. A similar port 159 through the end portion of casing 116 opens into chamber 129. A tubular extension 161 having a bleed 163 removably secured therein is threadedly engaged with port 159. Conduit 165 removably secured to tubular extension 161 provides for the communication of fluid pressure between chamber 129 and chamber 53.

In the following discussion of the operation of Figures 2 and 3, the associated fluid pressures are denoted by the letter P with modifying subscripts as follows:

$P_1$=Fuel pump discharge pressure.
$P_2$=Unmetered fuel pressure.
$P_3$=Density compensating fuel pressure.
$P_3'$=Modified $P_3$ fuel pressure.
$P_4$=Metered fuel pressure.

*Operation of Figure 2*

It is to be assumed that the engine is operating initially at an idle setting under sea level conditions.

At idle conditions, the governor valve 41 is displaced by spring 59 to provide a normal idle fuel flow to the engine. The force of the governor weights 73 will balance with the spring force thus maintaining the governor valve position. The regulator valve 29 is acted upon by weights 77 coacting with the $P_2$—$P_3$ differential across the regulator valve diaphragm 27 to produce the required metering head for the particular throttle setting. The $P_2$—$P_4$ differential across piston 125 is insufficient to cause displacement of piston 125 against the force of spring 153 and valve 141 is maintained in an open position.

The throttle is now advanced to a maximum speed position. The governor valve 41 is caused to move to a wide open position to provide for maximum fuel delivery to the engine. The regulator valve 29 being under the influence of an increasing weight force which acts thereon begins to open wider as the engine accelerates in order to maintain the required $P_2$—$P_4$ differential. Valve 141 remains open until a speed of approximately 70–80% maximum r.p.m. is reached. Below this speed, the normal acceleration fuel schedule is delivered to the engine and it accelerates along the lower portion (d) of the normal acceleration curve of Figure 6. Assuming a constant compressor inlet air density the contoured needle 91 will remain in a fixed position in orifice 93. When the accelerating engine reaches a speed of 70–80% maximum r.p.m., the $P_2$—$P_4$ differential which exists across governor valve 41 and piston 125 will have reached a value such that piston 125 is removed from contact with valve stem 143 and valve 141 is caused to close. The valve 141 does not close instantaneously due to the force of spring 153 acting in opposition to the $P_2$—$P_4$ differential across piston 125. As the engine speed increases toward 70–80% maximum r.p.m. the piston 125 will be displaced such that seating or closing of valve 141 will occur at the 70–80% maximum r.p.m. point. The closing of valve 141 results in a stoppage of flow through bleed 139 and a reduction of $P_3$ in chamber 117. $P_2$ will be confined to chamber 127 where it will continue to urge piston 125 against spring 153 and away from valve stem 143. As the $P_2$—$P_4$ differential approaches a maximum, piston 125 will assume a position as shown by the dashed outline thereof. The reduced $P_3$ in chamber 117 is transmitted through port 155 and conduit 157 to chamber 99 thence through passage 97 to chamber 25 where the reduction in pressure causes an increase in $P_2$—$P_3$ differential across regulator valve diaphragm 27. The $P_3$—$P_4$ differential across orifice 93 is also affected by the decrease in $P_3$ and is reduced accordingly. The increased $P_2$—$P_3$ differential results in a force unbalance between weights 77 and diaphragm 27 such that the regulator valve 29 is urged in a closing direction which in turn causes a reduction in the $P_2$ pressure. The force unbalance is momentary and the $P_2$—$P_3$ differential required to balance the force of weights 77 is quickly re-established whereupon the engine will continue accelerating to maximum speed as shown by portion (e) of the normal acceleration curve of Figure 6.

After the engine has reached maximum speed, the pilot moves the throttle lever to an idle position. The governor valve 41 moves accordingly to a position of minimum flow due to the removal of the force of spring 59 thereon.

The regulator valve 29 is caused to move towards a closed position as the force of weights 77 decreases in response to engine deceleration. The $P_2$—$P_4$ differential across piston 125 will decrease accordingly and spring 153 will cause piston 125 to be displaced towards valve stem 143. Fuel flowing at $P_4$ into chamber 129 will be restricted by bleed 163 which imposes a time delay on the action of piston 125 before it may act to re-open valve 141. The time delay corresponds to the time required for the engine to decelerate from maximum speed to idle speed and immediately reaccelerate to point 1 on the curve of Figure 6 under maximum rates of deceleration and acceleration. The time delay may be varied by installing a bleed 163 in accordance with the characteristics of the particular engine to be used.

Let us now assume that, as the engine approaches 50% of maximum r.p.m. during its deceleration from maximum speed, the pilot wishes to immediately reaccelerate the engine to maximum speed. Since the time delay action of bleed 163 has prevented piston 125 from contacting valve stem 143 to allow a subsequent opening of valve 141, the leaner fuel schedule as provided for by the reduced $P_3$—$P_4$ and $P_2$—$P_4$ differentials will be delivered to the engine. The engine will accelerate along portions (a) and (b) of the modified acceleration curve of Figure 6 thereby skirting the aforementioned lowered stall area. Upon reaching the 70–80 percent maximum r.p.m. point the rising $P_2$—$P_4$ differential will check the movement of piston 125 toward valve stem 143 and urge the piston 125 away from the valve stem 143 such that valve 141 remains in a closed position. The engine will continue to accelerate along curves (c) and (e) of Figure 6. The piston 125 will move to the position shown in dotted outline in accordance with the increasing $P_2$—$P_4$ differential. The distance between curves (c) and (e) is exaggerated slightly in order to point up the fact that these curves are not entirely coextensive. The same leaner fuel schedule will be delivered to the engine regardless of the number of reaccelerations which are caused to occur.

If the engine is allowed to stabilize at any given speed in the critical stall area range, the time delay bleed 163 will permit piston 125 to contact valve stem 143 and cause valve 141 to open. The normal acceleration fuel schedule will then be delivered to the engine since the engine will then be able to tolerate the richer fuel delivery within the critical stall range without entry into compressor stall. The stabilization of engine speed permits operating temperatures to reach normal and the aforementioned lowered stall area will not exist.

Figure 3 illustrates a modified form of the instant invention in which all parts of the main metering unit 20a are identical with those shown in Figure 2 and corresponding parts have similar numbers. Most of the unit 20a is shown broken away leaving only that portion necessary to show conduit connections. It comprises a flow rescheduling unit 20c including a casing 167 having two sections 169 and 171 formed therein by an annular shoulder member 173. The section 169 is divided into two chambers, 175 and 177, by the diaphragm 179 which is securely attached at its outer edge to casing 167. A conduit 181 communicates fluid pressure from chamber 51 to chamber 175 by means of port 183 which opens into chamber 175. A spring 185 interposed between diaphragm 179 and shoulder member 173 acts to urge diaphragm 179 away from shoulder member 173. The section 171 is divided into two chambers, 187 and 189, by the diaphragm 191 which is securely attached at its outer edge to casing 167. A spring 193 interposed between diaphragm 191 and shoulder member 167 tends to urge diaphragm 191 away from shoulder member 173. A conduit 195 serves to transmit $P_3$ fluid pressure from chamber 25 through port 197 into section 171 which communicates with both sides of diaphragm 191 by means of passages 199 and 201. Passage 199 communicates fluid pressure through a bleed 203 to chamber 187 and passage 201 communicates fluid pressure to chamber 189. A spring loaded check valve member 205 located adjacent to the bleed 203 serves to provide a parallel means of transmitting fluid between chamber 187 and conduit 195. The end portion of casing 167 adjacent to chamber 189 has an outwardly extending tubular portion 207 which communicates with chamber 189 through a central passage 209 in valve seat member 211 which is threadedly engaged in an opening 213 in casing 167. An annular flange 215 formed on the outer portion of valve seat member 211 serves to limit the threaded engagement of the valve member in opening 213. An adjustable bleed 217 is secured in tubular portion 207 and controls all fluid flow therethrough. The conduit 219 communicates tubular portion 207 with the metered fuel chamber 53. A half-ball valve member 221 is positioned adjacent to a raised central portion 191' of diaphragm 191 such that the half-ball member 221 may be actuated thereby to engage the valve seat member 211. A spring 223 positioned in a recess 225 in valve seat member 211 acts in such a manner as to tend to unseat half-ball member 221. An adjustable stop 227 threadedly engaged with shoulder member 173 serves to limit movement of diaphragm 191 and thus valve member 221 away from valve seat member 211. The openings 227' through the adjustable stop 227 provide for passage of fluid between chambers 187 and 177.

*Operation of Figure 3*

In describing the operation of Figure 3, the engine is assumed to be operating initially at an idle position. Fluid pressures within the fuel metering system are in a stabilized condition and pressure values are according to the engine demand.

The pilot's lever is now moved to a position requesting maximum speed. The governor valve 41 is caused to move to provide a larger opening of the orifice 47 thereby resulting in an increased fuel flow to the engine. As engine speed increases, the regulator valve 29 moves in response to the increased thrust generated by weights 77 coacting with the unbalance in pressure differential across regulator valve metering head diaphragm 27. The change in forces acting on the regulator valve 29 is reflected in the opening of the regulator valve to provide a greater flow of fuel at $P_1$ pressure. As the engine accelerates, the density compensating circuit bellows 109 is caused to function as a result of compressor inlet air pressure and temperature and the contoured needle 91 is actuated accordingly. If the engine is operated under constant inlet air density conditions, the contoured needle 91 will maintain a fixed position in orifice 93 accordingly. As acceleration progresses, the $P_2$—$P_3$ differential across diaphragm 27 increases due to the restriction of $P_2$ by the control restrictions 95 in regulator valve diaphragm 27. The $P_2$—$P_3$ differential is also conveyed by conduits 181 and 195 to diaphragm 179 in casing 167 and the resulting force causes a displacement of diaphragm 179 towards the region of $P_3$ pressure. In order to limit the pressure differential across bleed 203 during fluid flow from chamber 187 to passage 199 the check valve 205 opens at a predetermined pressure differential against the light spring force acting thereagainst and a rapid flow of fluid is permitted from chamber 187. The $P_3$ pressure on either side of diaphragm 191 will be substantially equal and the half-ball 221 will be held against valve seat 211 by the force of spring 193. As long as the half-ball 221 is maintained in a closed position, no change in the normal fuel schedule will take place. The engine will accelerate along the normal acceleration curve as indicated in Figure 6. After the engine has been operating at maximum speed for a short time, the temperatures will have reached a stabilized maximum condition. The pilot may then desire to decelerate the engine to idle speed and the pilot's lever is moved accordingly. The governor valve 41 is caused to move against the minimum flow stop and fuel flow to the engine is decreased. The $P_2$—$P_3$ pressure differential across the regulator diaphragm, as well as across diaphragm 179, will decrease in response to the decreasing speed due to closing of the governor valve 41. As the $P_2$—$P_3$ differential across diaphragm 179 decreases, the force of spring 185 will cause diaphragm 179 to be displaced toward the region of $P_2$. The displacement of diaphragm 179 produces an increase in volume between diaphragms 179 and 191 with a subsequent decrease in $P_3$ to $P_3'$ due to the restriction of $P_3$ through bleed 203. The $P_3$—$P_3'$ differential which also occurs across diaphragm 191 will effect a displacement of diaphragm 191 towards the adjustable stop 227 thereby allowing the unseating of half-ball 221 from valve seat 211 by spring 223. Fuel at $P_3$ pressure is then permitted to flow from chamber 189 through passage 207 and bleed 217 to conduit 219 which then transmits the flow to chamber 53. A decrease in $P_3$—$P_4$ differential across the aneroid needle 91 will take place due to the bleeding off of $P_3$ pressure through the bleed 217 and a corresponding movement of the regulator valve will occur, due to an increased $P_2$—$P_3$ differential across diaphragm 27, to provide a reduced metering head across governor valve 41.

As in the case of Figure 2 the pilot may desired to apply immediate full power and accelerate to maximum speed from 50 percent maximum r.p.m. during the period of engine deceleration, in which case the engine operating temperatures would be at relatively high unstabilized values and a reduced amount of fuel must be provided for the acceleration if the aforementioned reacceleration stall condition is to be avoided. The pilot's lever is moved to the position of maximum speed and the aforementioned sequence of governor valve and regulator valve movement will take place with a reduced $P_3$—$P_4$ differential across the aneroid needle 91. The reduced $P_3$—$P_4$ differential results in a lower metering head across governor valve 41 and a subsequent leaner fuel metering schedule available for acceleration. The half-ball 221 will be held in the open position for a predetermined length of time depending upon the bleed 203 during which time the aforementioned leaner metering schedule will be maintained. The engine will be caused to accelerate along lines (a) and (b) of the modified acceleration curve, shown in Figure 6, until point 1 is reached. At this time, $P_3'$ has gradually increased toward $P_3$ until the $P_3$—$P_3'$ differential across diaphragm 191 has decreased to a value which permits diaphragm 191 to move away from stop 227 under the influence of spring 193. The half-ball 221 being contacted by the raised portion 191' of diaphragm 191 is caused to seat against valve seat 211. Additional fuel as scheduled by a normal acceleration may now be metered to the engine without danger of entry into stall conditions. The regulator valve 29 and aneroid needle 91 pressure drops assume normal metering head action and the engine is accelerated along the upper portion (c) of the modified acceleration curve of Figure 6. The bleed 217 is adjustable and serves to control the decrease in fuel flow with respect to the normal acceleration schedule during the reacceleration of the engine. The bleed 217 may be set for any desired percentage of leaning of the normal acceleration schedule.

Figure 4:
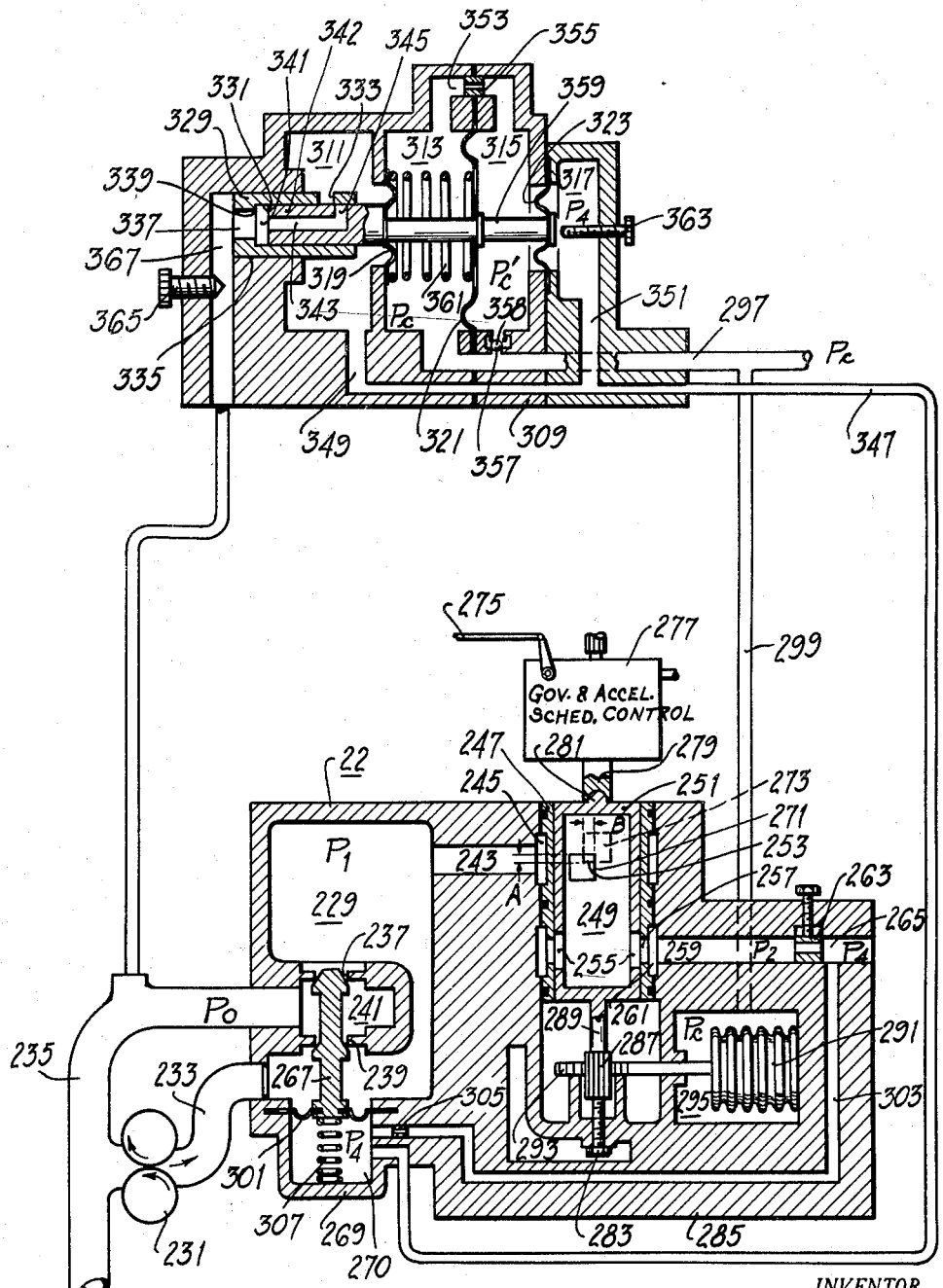
Figure 4 is a sectional view of a fuel control as shown in Figure 1 with another embodiment of the present invention removed from the main control and drawn in enlarged form.

*Figure 4*

Referring now to Figure 4, the numeral 22 refers to a fuel control of the constant head, variable area type. Fuel at pressure $P_1$ is received in chamber 229 from the pump 231 and inlet conduit 233. The total flow of fluid into chamber 229 is divided into two flow paths, one of which returns a portion of the fuel to pump inlet conduit 235 by way of by-pass ports 237 and 239 and a by-pass chamber 241, and the other of which conducts the remainder of the fuel to the burner nozzle 16, see Figure 1, by way of a conduit 243, and inlet annulus 245 formed between the housing and a fixed cylindrical sleeve member 247, a chamber 249 formed by an axially and rotatably actuable hollow cylindrical metering valve 251 and connected to annulus 245 by a main metering port 253, valve and sleeve outlet ports 255 and 257, a conduit 259 connected to said ports by an outlet annulus 261, an adjustable minimum flow restriction 263, the discharge conduit 265 and the fuel manifold and fuel lines, shown in Figure 1. The by-pass ports 237 and 239 are controlled by a double landed poppet valve 267 which is controlled to maintain a constant pressure differential across metering port 253 by a regulator unit 269 which includes a chamber 270.

A square port 271 formed in the wall of metering valve 251 is adapted to variably register with a square port 273 formed in the wall of the fixed sleeve member 247 to vary the effective area of the metering port 253 which connects the inlet annulus 245 to the valve chamber 249. The metering port 253 is either square or rectangular in shape and the area thereof is determined by dimensions A and B; dimension B is varied whenever the rotational position of the metering valve changes; and dimension A is varied whenever the axial position of the valve changes. Mechanism for controlling the axial and rotational positions of valve 251, which is herein shown somewhat diagrammatically, is disclosed in detail and in various embodiments in application Serial Nos. 248,402 filed September 26, 1951, in the name of H.C. Zeisloft now abandoned, and 499,432 filed April 5, 1955, in the names of H. J. Williams, B. J. Ryder and F. R. Rogers (common assignee).

An engine all-speed governor control responsive to engine speed and the position of pilot controlled lever 275, and an acceleration fuel scheduling control responsive to engine speed and compressor inlet temperature, are shown in diagrammatic form at 277, said governor and acceleration controls being arranged in mutually overriding relation such that that one which allows the least quantity of fuel to flow through metering port 253 controls the A dimension thereof. The governor portion of control 277 controls the axial position of valve 251, or A dimension of port 271, during governor cut-off and engine equilibrium operation, whereas the acceleration scheduling portion of said control, which may include a contoured three dimensional cam actuable as a function of engine speed and compressor inlet temperature, varies the axial position of the metering valve during an acceleration of the engine in accordance with a predetermined schedule. The control 277 is connected to the metering valve by a rod 279 and a ball joint 281. An adjustable minimum flow stop 283 which is mounted in the housing 285, is shown abutting one end of a pinion 287 which is connected to the valve 251 by a rod 289. Abutment between the minimum flow stop 283 and the pinion 287 exists only during a deceleration of the engine, which may be initiated by resetting the governor portion of control 277 to a lower than existing speed. Initiation of an engine deceleration results in a closing movement of the valve 251 to the position shown; the resulting fixed minimum A dimension of port 48 obtains until such time as governor action returns the engine to equilibrium operation at the new selected speed.

The rotational position of metering valve 251 and the B dimension of port 253 are controlled by an evacuated bellows 291 which is connected to the pinion 287 by a rack 293, said bellows being mounted in a chamber 295 which is connected to the discharge side of compressor 13 by the conduits 297 and 299. A variation in compressor discharge pressure results in a like variation in the pressure in chamber 295 and a movement or change in length of bellows 291 which is proportional to the change in compressor discharge pressure, said change in length effecting a corresponding change in the rotational position of valve 251 through the rack and pinion 293 and 287. For example, an increase in compressor discharge pressure causes a partial collapse of bellows 291 and a counterclockwise movement of pinion 293 and valve 251, when viewed from the pinion end, which increase the B dimension of metering port 253 an amount which is proportional to the increase in discharge pressure.

The by-pass valve 267 is controlled by a $P_1$—$P_4$ differential acting across the by-pass valve diaphragm 301. The by-pass valve 267 serves to maintain a constant $P_1$—$P_4$ differential across metering valve 251 irrespective of the area provided by metering ports 271 and 273. Chamber 270 communicates with discharge conduit 265 through a passage 303 having a bleed 305 therein. Bleed 305 serves to control the sensitivity of by-pass valve 62. The spring 307 acts as a pre-load on by-pass valve 267 and coacts with the pressure $P_4$ in opposition to pressure $P_1$ on the opposite side of diaphragm 301. A decrease in pressure $P_4$ on the lower side of diaphragm 301 results in a higher $P_1$—$P_4$ differential thereacross and by-pass valve 267 is caused to move towards an open position thus diverting sufficient fluid through orifices 237 and 239, and conduit 235 back to the pump inlet to re-establish the correct $P_1$—$P_4$ differential across metering valve 251. If $P_4$ should increase, the $P_1$—$P_4$ differential across diaphragm 301 would decrease and by-pass valve 267 would move towards a closed position thus increasing the flow to the metering valve 251 until the $P_1$—$P_4$ differential thereacross is re-established to its correct value.

A modified form of the means whereby the normal acceleration fuel feed schedule is varied to obtain a leaner schedule at certain times is shown in Figure 4 in enlarged section and removed from the remaining parts of the control. It comprises a casing 309, the interior of which is divided into a series of chamber 311, 313, 315 and 317 by the diaphragms 319, 321 and 323 which are secured at their outer edges to casing 309. An annular valve guide 329 having a bore 331 and opening 333 through the sidewall is removably secured in a passage 335 in casing 309 with a portion of the guide including opening 333 extending into chamber 311. A reduced diameter passage 337 is formed by shoulder 339 which extends radially inward from the inner surface of one end of valve guide 329. A passage 341 communicates conduit 235 with bore 331 at all times through reduced diameter passage 337. A valve 342 having an axial bore 343 and a radial bore 345 extending inwardly from the side thereof is slidably received in valve guide 329. The inner ends of the axial and radial bores, 343 and 345 respectively, terminate at a common point such that a continuous passage is formed through valve 342. The radial bore 345 is adapted to register with opening 333 at certain times and will provide a maximum opening when valve 342 abuts against shoulder 339. A fluid passage 347 connects fuel outlet conduit 265 with passages 349 and 351 which are parallel and open into chambers 311 and 317 respectively. A conduit 297 is provided to establish communication between chamber 313 and compressor 13. A passage 353 having a bleed 355 removably secured therein provides a means of communication between chambers 313 and 315. A passage 357 having a check valve 358 therein is in parallel with bleed 150 to provide means conducting a rapid flow of fluid into chamber 315 thus assuring a maximum $P_c'$ pressure at any time during an engine acceleration. A valve stem 359 secured to and extending from the closed end of valve 342 is removably secured to diaphragms 319, 321 and 323 at the center portions thereof. A low pre-load, low rate spring 361 interposed between casing 309 and diaphragm 321 serves to urge valve 342 to a closed position. An adjustable stop 363 threadedly engaged with casing 309 serves to prevent valve 342 from overrunning a closed position. An adjustable member 365 threadedly engaged with casing 309 provides for restriction of flow through passage 367.

Pressures within the following systems shown in Figures 4 and 5 are designated by P and modified with subscripts as follows:

$P_1$=Pump discharge pressure.
$P_0$=Pump return pressure.
$P_4$=Metered fuel pressure.
$P_c$=Compressor discharge pressure.
$P_c'$=Modified compressor discharge pressure.
$P_i$=Compressor inlet pressure.

*Operation of Figure 4*

It is to be assumed that the engine is initially at idle with stabilized fluid pressures existing in the fuel system.

At idle position, the governor portion of the control maintains a particular position or A dimension of metering port 253. The rotational or B dimension of metering port 253 is determined by the compressor discharge pressure $P_c$. A constant $P_1$—$P_4$ differential across the metering valve 251 is maintained by the by-pass valve 267. The pressure $P_4$ in chamber 270 is transmitted through passages 347, 349 and 351 to chambers 311 and 317. The opposing forces resulting from pressure $P_4$ acting against diaphragms 319 and 323 are equal and serve to eliminate pressure level sensitivity of valve 342. Passage 297 transmits compressor discharge pressure $P_c$ to chamber 313 and to chamber 295 by means of passage 299. The $P_c$ pressure subsequently flows from chamber 313 through bleed 355 into chamber 315. At any stabilized speed, the pressures in chambers 313 and 315 are equal and diaphragm 321 remains unaffected. Spring 361 urges valve 342 against stop 363 thus maintaining valve 342 in a closed position. A normal $P_1$—$P_4$ metering head is maintained across metering valve 251 by by-pass valve 267 as long as valve 342 is in the closed position.

The pilot now moves the throttle lever to a maximum speed position. The A dimension of metering port 253 is increased to allow for sufficient fuel for acceleration. Due to the greater A dimension, a momentary decrease in pressure drop $P_1$—$P_4$ across metering valve 251 takes place and diaphragm 301 is caused to be displaced thereby closing the by-pass valve in an attempt to re-establish the proper $P_1$—$P_4$ drop across metering valve 251. As the engine accelerates, pressure $P_c$ increases and, due to the action of spring 361, the valve 342 will be maintained in a closed position. The check valve 357 will open at a predetermined $P_c$—$P_c'$ differential thereby ensuring a maximum value of $P_c$ in chamber 315. The normal acceleration fuel schedule is delivered to the engine and it accelerates to maximum speed along the normal acceleration curve of Figure 6. At maximum speed, $P_c'$ will equal $P_c$ and diaphragm 321 will remain fixed.

After stabilizing at maximum speed, the throttle lever is then moved to idle position which initiates a deceleration of the engine. The A and B dimensions are varied accordingly and the engine speed begins to decrease. Curves (f) and (g) of Figure 6 illustrate such a condition. The compressor discharge pressure $P_c$ in chamber 313 begins to decrease at a faster rate than $P_c'$ in chamber 315 due to the restricting action of the bleed 355. The resulting $P_c$—$P_c'$ differential produces a force which overcomes the force of spring 361 and causes diaphragm 321 to be displaced away from chamber 315. Movement of diaphragm 321 is transmitted through valve stem 359 to valve 342 where it results in the registering of radial bore 345 with opening 333 in valve guide 329. Fluid at pressure $P_4$ then escapes through opening 333, bores 345 and 343, and passages 337, 367 and 341 to passage 30 where it returns to the pump inlet. The decrease in pressure $P_4$ is transmitted to by-pass valve diaphragm 301 where it results in an increased $P_1$—$P_4$ differential across the diaphragm. The increased $P_1$—$P_4$ differential causes by-pass valve 267 to open wider and more fluid at pressure $P_1$ is diverted back to the pump inlet. The $P_1$—$P_4$ differential across metering valve 251 is reduced and a correspondingly reduced fuel delivery to the engine will be effected.

Before reaching engine idle, the pilot may initiate an immediate reacceleration by moving the throttle lever to a maximum speed position. The A and B dimensions of the metering valve are established accordingly. The bleed 355 which acts as a time delay for stabilization of pressure across diaphragm 321 has maintained $P_c'$ at a higher pressure level than is $P_c$. The valve 342 will be caused to abut shoulder 339 thus presenting a maximum opening of bore 345 which in registering with opening 333 causes a maximum bleeding off of fluid at $P_4$ in chamber 311. The decreased $P_1$—$P_4$ differential acting on by-pass valve diaphragm 301 serves to maintain a lower $P_1$—$P_4$ differential across the metering valve 251 and a leaner fuel schedule is effected for engine acceleration. The engine will accelerate along curves (a) and (b) of Figure 6. As engine speed increases the $P_c$—$P_c'$ differential decreases until stabilization occurs at which point the valve 342 closes in response to the force of spring 361 allowing the resumption of a normal fuel metering schedule. The engine will have passed the stall region and the additional fuel may be delivered to the engine with no adverse effects. Additional reaccelerations from a decelerating engine condition will result in the same sequence of operations. If the engine is allowed to stabilize at any intermediate speed between maximum and idle, the $P_c$—$P_c'$ differential will also stabilize and valve 342 will be at a closed position thus providing a normal fuel metering schedule for a reacceleration from that point. The time delay of the leaner acceleration schedule is reduced with altitude in proportion to reduction in altitude density. The adjustable bleed restriction 365 serves to provide for varying percentages of desired fuel schedule leanout. A greater restriction presented by bleed 365 to flow through passage 367 results in a smaller percentage of fuel schedule lean-out of the normal acceleration fuel schedule and the opposite is true of a lesser restriction.

Figure 5

Figure 5 shows a variable head, variable area type fuel control having a modulated pressure unit which operates as a function of compressor pressure ratio $$\frac{P_c}{P_i}$$

The fuel control shown includes a casing 369 having chambers 371 and 373 formed therein by a partition 375 having a centrally metering orifice 377. A stem 379 secured to a metering valve 381 extends axially therefrom through an opening 383 in casing 369 into a chamber 385 where it is securely attached to one end of a bellows 387 contained therein. The opposite end of bellows 387 is securely anchored to casing 369. Valve member 381 is thus arranged to be reciprocably actuated within orifice 377 by bellows 387 to vary the flow through the orifice. An O ring 389 contained by a recess 391 in casing 369 serves as a fluid seal between casing 369 and stem 379. Communicating with chamber 385 are a plurality of ports 393, 395 and 397. A bleed 399 secured in port 393 operates to restrict fluid flow from chamber 385. Port 395 having a calibrated bleed 401 therein communicates compressor inlet pressure $P_1$ to chamber 385. Port 397 having a calibrated bleed 403 therein communicates with compressor discharge pressure $P_c$ by means of conduit 405. Casing 369 is provided with an opening 407 which communicates with the interior of chamber 373. A passage 409 serves to communicate pressurized fluid from a pump 411, to the opening 407. An outlet passage 413 serves to conduct metered fluid from chamber 371 to an engine manifold, not shown. A conduit 415 threadedly engaged in a port 417 in casing 369 provides for the transmission of metered fluid pressure $P_4$ to a speed-pressure head control for governing and acceleration unit 419 shown in diagrammatic form. Fluid at unmetered pressure $P_1$ is transmitted to the speed-pressure head control for governing and acceleration unit 419 by means of a conduit 421 threadedly engaged in a port 423 communicating with passage 409. A conduit 425 communicating the governor and acceleration control with the pump inlet serves as a fluid return passage.

The modulated pressure chamber 385 receives a compressor discharge pressure $P_c$ through bleed 403 and a compressor inlet pressure $P_i$ through bleed 401. The size of the calibrated bleeds 403 and 401 is carefully selected so that the bleeds have a predetermined area ratio, the selection of which is determined by the particular compressor stall characteristics of any given engine. It has been found that with a properly selected bleed area ratio, modulated $P_c$ pressure $P_m$ varies directly or is effectively a measure of some predetermined function of compressor pressure ratio $$\left(\frac{P_c}{P_i}\right)$$

The specific desired function of compressor ratio for any given engine, as effectively measured by pressure $P_m$, is determined by the selected ratio of the bleed areas. The bleed areas are selected so that the velocity of the flow of fluid through the inlet pressure $P_1$ bleed 401 reaches sonic at some predetermined compressor pressure ratio, which results in pressure $P_m$ becoming some predetermined fixed percentage of pressure $P_c$ at all compressor ratios above said predetermined ratio.

As modulated pressure $P_m$ increases, as for example during acceleration, the pressure imposes an increasing force which tends to collapse bellows 387 and cause movement of metering valve 381 towards a more open position. The position of the metering valve in orifice 377 will be effectively fixed for any given value of modulated pressure $P_m$.

The above mentioned fuel control has been simplified in construction and only that portion which is modified by the present invention is described in any detail. For a detailed description of the structure and operation of the control, see application Serial No. 388,754 filed October 28, 1953, in the names of Elmer Haase and Albert Schnaible and having a common assignee.

Referring to the present invention, a casing 427 is provided having a plurality of ports 429, 431 and 433. The casing is divided into a series of chambers 435, 437 and 439 by flexible diaphragms 441 and 443. An annular valve guide 445 having a bore 447 is removably secured in an opening 449 in casing 427. A reduced diameter passage 451 is formed by shoulder 453 which extends radially inward from the inner surface of valve guide 445. A portion of valve guide 445 having a port 455 through the sidewall thereof extends into chamber 435. A valve member 457 having an axial bore 459 and a radial bore 461 is slidably received in valve guide 445. The inner ends of the axial and radial bores, 459 and 461, terminate at a common point thereby providing a continuous passage through valve member 457. The radial bore 461 is adapted to register with port 455 at certain times. Pressure $P_m$ is transmitted to chamber 435 via bleed 399, passage 463 and port 429. A partition 465 having a central opening 467 extends radially inward from casing 427 to provide a means of securing the outer edges of diaphragm 441 which extends across opening 467. A valve stem 469 attached to and extending from the closed end of valve 457 is securely attached to diaphragms 441 and 443 at the center portions thereof. Diaphragm 443 is secured at its outer edge to casing 427. Communication between chambers 435 and 437 is established by passage 471 having a bleed 473 secured therein. A passage 472 having a check valve 474 therein is arranged in parallel with bleed 473 to permit a maximum pressure rise in chamber 439 during engine acceleration. Chamber 435 is vented through port 455, bores 461 and 459, passage 451 and port 431 to $P_1$ or to the atmosphere as desired. Port 433 opening into chamber 437 communicates compressor discharge pressure $P_c$ thereto by means of a conduit 475. A low rate spring 477 interposed between diaphragm 443 and partition 465 serves to urge diaphragm 443 and valve stem 469 towards an adjustable stop 479 threadedly engaged with casing 427. When valve stem 469 abuts against adjustable stop 479 valve 457 will be in a closed position.

*Operation of Figure 5*

It is assumed that the engine is initially at idle with stabilized pressures existing within the fuel system.

Valve 381 is maintained at a fixed position in orifice 377 as a result of a stabilized modulated $P_c$ pressure $P_m$. The pressure drop across the metering orifice 377 is controlled by the speed-pressure head control 419 which functions to provide a pressure drop which varies as the square of engine speed. Fuel in excess of that required by the engine will be caused to return to the pump inlet through conduit 425. Fuel is delivered through passage 413 to the fuel manifold of the engine at a constant rate. The pressures acting on diaphragm 443 will be equal and stabilized and valve 457 will be urged to a closed position by the force of spring 477 acting against diaphragm 443. The pilot now moves his throttle lever to a maximum speed position. The speed-pressure head control 419 acts to provide a greater metering head $P_1-P_4$ across metering orifice 377 thereby increasing fuel delivery to the engine. As the engine accelerates compressor discharge pressure $P_c$ increases and the resulting $P_c-P_c'$ differential across diaphragm 443, in addition to the force of spring 477 will act against diaphragm 443 thereby holding the valve 457 in a closed position. The check valve 474 will open at a relatively low $P_c-P_c'$ differential after which $P_c-P_c'$ will become equal and valve 457 will be held closed by the force of spring 477 alone. When the engine has reached maximum speed, the speed-pressure head control acts to establish the proper steady state metering head across orifice 377 and the engine maintains a maximum speed with compressor discharge pressure $P_c$ remaining at a constant value. The modulated compressor discharge pressure $P_m$ existing in chamber 385 will increase as the engine accelerates and cause movement of valve 381 to provide a larger opening in orifice 377 according to the normal schedule thus avoiding entry into the normal stall region. Fuel flow through orifice 377 will be caused to increase with a subsequent increase in fuel delivery to the engine.

The throttle is now moved to an idle position and a deceleration of the engine is initiated. The governor control acts to decrease the metering head across orifice 377 thus resulting in a decreased fuel flow therethrough to the engine. As the engine decelerates, compressor discharge pressure $P_c$ is caused to decrease resulting in an unbalance of pressures across diaphragm 443. Due to bleed 473 this pressure unbalance $P_c-P_c'$ will be maintained and diaphragm 443 will be urged to move in opposition to the force of spring 477. When sufficient force develops, diaphragm 443 will cause valve 457 to move to an open position allowing modulated pressure $P_m$ to flow therethrough into chamber 435 where it will subsequently escape through valve 447 and port 431 to the compressor inlet or to the atmosphere as desired. Bleed 399 will provide a restriction to $P_m$ flow out of chamber 385 thereby preventing a sudden decrease of $P_m$ in chamber 385. The decrease in modulated pressure $P_m$ acting on bellows 387 causes an expansion thereof and a subsequent actuation of valve 381 towards a closed position.

The throttle lever is now moved to a position of maximum speed while the engine is decelerating and approaching an idle condition. Due to the action of bleed 473 a time delay in pressure stabilization across diaphragm 443 is effected and valve 457 is maintained open. The speed-pressure head control 419 again controls the flow of fuel to the engine to cause acceleration thereof. As compressor discharge pressure increases, modulated pressure $P_m$ also increases but is maintained at a lower value by the action of valve 457 which continues to bleed pressure $P_m$ from chamber 385. Bellows 387 responding to a lower pressure $P_m$ causes metering valve 381 to move a lesser amount thus presenting a smaller orifice opening and accompanying decreased fuel flow to the engine. As the engine continues to accelerate under the leaner fuel schedule, entry into the critical lowered stall area is avoided. As compressor discharge pressure $P_c$ increases, a stabilization of pressure across diaphragm 443 will subsequently occur at which time spring 477 will force valve 457 to the right. Valve 457 will be caused to close due to the force of spring 477 acting against diaphragm 443. Modulated pressure $P_m$ will increase to its full value and a corresponding actuation of metering valve 381 will occur thus providing a normal fuel metering schedule to the engine. Since the critical stall area has been safely passed, the engine may now tolerate the increased fuel flow with no adverse effects.

Although only a limited number of embodiments are shown and described herein, it will be apparent to those skilled in the art that various changes may be made to suit requirements of a particular application without departing from the scope of the invention.

I claim:

1. In a fuel system for a gas turbine engine having a burner, the combination of a conduit for supplying fuel under pressure to the burner, means operatively connected with said conduit for metering fuel to said burner according to a predetermined fuel flow schedule in accordance with an engine acceleration from a stabilized operating condition and control means operably connected with said first named means for automatically causing a variation in said predetermined fuel flow schedule to said burner during subsequent reaccelerations from a non-stabilized engine speed said control means including mechanism for rendering said control means inoperative at a predetermined engine speed during said reaccelerations from a non-stabilized engine speed.

2. In a fuel system for a gas turbine engine having a burner, the combination of a conduit for supplying fuel under pressure to the burner, means operatively connected with said conduit for controlling the amount of fuel being delivered to said burner during an engine acceleration from a stabilized engine operating condition, and means operatively connected with said first named means for automatically decreasing the fuel flow to said burner during an engine reacceleration occurring within a predetermined time interval after said acceleration from a stabilized engine operating condition, said last named means including means for rendering said last named means inoperative at the end of said predetermined time interval.

3. In a device for controlling the flow of fuel to the burner of a gas turbine engine, a fuel supply conduit, a fuel metering valve in the conduit, a regulating valve in the conduit in series flow relationship to said metering valve for controlling the metering head thereacross, a first pressure responsive member having a fixed orifice operably connected to said regulating valve and adapted to respond to a pressure drop across said fixed orifice, valve means paralleling said fixed orifice adapted to modify the pressure drop thereacross, a second pressure responsive member adapted to actuate said valve means responsive to a pressure drop across said metering valve, and means associated with said second pressure responsive member for controlling the rate of response thereof, said valve means when closed acting to provide a decreased fuel delivery to said burner.

4. In a fuel system for a gas turbine engine having a compressor and a burner, the combination of a conduit for supplying fuel to said burner, a fluid pump for supplying fuel under pressure to said conduit, first valve means in said conduit for controlling the fuel flow therethrough, second valve means operatively connected with said first valve means for maintaining a constant pressure differential thereacross, first pressure responsive means responsive to a pressure difference between first and second fluid chambers attached to said second valve means, a passage connecting said first chamber with said conduit upstream from said first valve means, a restricted passage connecting said second chamber with said conduit downstream from said first valve means, second pressure responsive means, a conduit communicating said second chamber with a low pressure side of said pump, a valve disposed in said last named conduit actuated by said second pressure responsive means, means communicating said second pressure responsive means with said compressor, a passage having a restriction therein communicating opposite sides of said second pressure responsive means, resilient means urging said valve toward a closed position, and adjustable restricting means disposed in said last named conduit between said valve and said fluid pump, said valve being adapted to respond to a pressure differential across said second pressure responsive means to modify the pressure differential acting on said first pressure responsive means during certain periods of engine operation whereupon the fuel flow to said burner is decreased.

5. In a fuel metering system for a gas turbine engine having a burner and a compressor, the combination of a conduit for supplying fuel to said burner, a fluid pump for pressurizing the fuel in said conduit, first and second valve means operative with said conduit for controlling the flow therethrough, first pressure responsive means connected to said first valve responsive to a pressure drop across said second valve, a chamber partially defined by said first pressure responsive means, passage means connecting said chamber and the inlet of said pump, second pressure responsive means responsive to compressor pressure, and third valve means operably connected to said second pressure responsive means and adapted to control the flow through said passage means, said third valve means being caused to open during certain periods of engine operation to reduce the pressure differential acting against said first pressure responsive means thereby producing a decrease in the fuel flow to the burner.

6. In a fuel system for a gas turbine engine having a compressor and a burner, a conduit for supplying fuel to the burner, a chamber, passages connecting said chamber with inlet and discharge pressures of said compressor, first pressure responsive means in said chamber adapted to respond to the pressure therein, first valve means operably connected to said first pressure responsive means and adapted to control the flow of fuel through said conduit, second pressure responsive means responsive to said compressor discharge pressure, a passage venting said chamber to a low pressure source, second valve means disposed in said last named passage operably connected to said second pressure responsive means, and calibrated restricting means in each of said passages, said second valve means being displaced to an open position during certain periods of engine operation to allow said chamber pressure to vent therefrom, said first pressure responsive means responding to variations of pressure in said chamber to effect a modification of fuel flow to said burner.

7. In a fuel system for a gas turbine engine having a compressor and a burner, a conduit for supplying fuel to the burner, a chamber, passages connecting said chamber with inlet and discharge pressures of said compressor, first pressure responsive means in said chamber adapted to respond to the pressure therein, first valve means operably connected to said first pressure responsive means and adapted to control the flow of fuel through said conduit, second pressure responsive means responsive to said compressor discharge pressure, a conduit hydraulically communicating opposed surfaces of said second pressure responsive means, flow restricting means disposed in said last named conduit, a passage venting said chamber to a low pressure source, second valve means disposed in said last named passage operably connected to said second pressure responsive means, and calibrated restricting means in each of said passages, said second valve means being displaced to an open position during certain periods of engine operation to allow said chamber pressure to vent therefrom, said first pressure responsive means responding to variations of pressure in said chamber to effect a modification of fuel flow to said burner, said fluid restricting means serving to control the rate of response of said second pressure responsive means.

8. In a fuel system as claimed in claim 4 wherein said adjustable restricting means may be adjusted to vary the decrease in fuel flow for a given position of said valve.

9. In a fuel system as claimed in claim 2 wherein said last named means includes valve means operatively connected to said first named means, a pressure responsive member operatively connected to said valve means, a conduit connecting the pressure responsive member with a control fluid pressure which varies as a function of engine speed and a calibrated restriction in said conduit for imposing a time delay on the response of said pressure responsive member in accordance with the operating characteristics of a given engine.

10. In a fuel metering system for a combustion engine having a burner and a characteristic range of unstable operation, the combination of a conduit connected to deliver fuel to the burner, a fuel metering valve means operatively connected to the conduit for controlling the fuel flow therethrough in accordance with a predetermined fuel flow schedule during an engine acceleration from a stabilized engine speed, a fuel flow path, a restriction in the fuel flow path, a member responsive to the pressure differential across said restriction operatively connected to said valve means, and a fuel flow rescheduling device for modifying said predetermined fuel flow schedule in accordance with an engine reacceleration from a non-stabilized engine speed to avoid said characteristic range of unstable operation, said fuel flow rescheduling means including a conduit connected in parallel flow relationship with said restriction, valve means in said conduit for controlling fuel flow therethrough, a member responsive to a control fuel pressure differential which varies as a function of engine speed operatively connected to said valve means, said valve means being actuated to a closed position by said second named member at a predetermined engine speed during said acceleration from a stabilized engine speed, and time delay means operatively connected to said second named member for delaying the response of said named member to a decrease in said control fuel pressure differential during said engine reacceleration from a non-stabilized engine speed.

11. In a fuel metering system for a combustion engine having a burner and a characteristic range of unstable operation, the combination of a conduit connected to deliver fuel to said burner, a fuel regulating valve in said conduit for controlling fuel flow therethrough to said burner, means responsive to a control fuel pressure operatively connected to said regulating valve for controlling fuel flow in accordance with a predetermined fuel flow schedule and a fuel flow rescheduling device operatively connected to said last named means for automatically causing a variation in said predetermined fuel flow schedule over said characteristic range of unstable operation, said fuel flow rescheduling means comprising a conduit for venting said control fuel pressure to a drain pressure, valve means in said conduit for controlling fuel flow therethrough, means responsive to a predetermined control fluid pressure differential for actuating said valve means to a closed position, and means operatively connected to said last named means for delaying valve opening movement of said last named means for a predetermined interval of time when said control fuel pressure differential falls below said predetermined value.

12. In a system for controlling the rate of fuel flow to a combustion engine having a burner, a conduit for supplying fuel under pressure to said burner, a throttle valve in said conduit for controlling fuel flow therethrough, a pressure regulating valve in said conduit for controlling the pressure head across said throttle valve, means responsive to a control fluid pressure differential which varies as a function of engine speed for controlling the operation of said pressure regulating valve, valve means connected to modify said control fluid pressure differential, means responsive to the pressure head across said throttle valve for controlling the operation of said valve means, resilient means for imposing a preload against said second named pressure responsive means in a direction to cause opening movement of said valve means, and means operatively connected to said second named pressure responsive means for controlling the rate of response of said second pressure responsive means to said pressure head, said valve means being held in an open position by said preload during a first acceleration of the engine to a predetermined engine speed and thereafter being caused to close for the remainder of the acceleration to maximum engine speed as a result of said pressure head overcoming said preload, said valve means remaining closed in response to the action of said last named means during subsequent reaccelerations to maximum speed from a non-stabilized engine speed.

13. In a system for controlling the rate of fuel flow to the burner of a combustion engine, a fuel supply conduit connected to deliver fuel to said burner, a throttle valve in the conduit for controlling the fuel flow therethrough, a pressure regulating valve operatively connected to said conduit for controlling the pressure head across said throttle valve, first pressure responsive means operatively connected to said regulating valve for controlling the operation thereof, said first pressure responsive means having a fixed orifice and being responsive to the pressure drop across said fixed orifice, valve means in parallel flow relationship with said fixed orifice, a second pressure responsive means operatively connected to said valve means for controlling the operation thereof, a first conduit connecting said second pressure responsive member with said fuel supply conduit downstream from said throttle valve, a second conduit connecting said second pressure responsive means with said fuel supply conduit upstream from said throttle valve, said second pressure responsive means being responsive to the pressure head across said throttle valve, and flow restricting means operatively connected to said first conduit for modifying said pressure drop to effect a time delay action on the response of said second pressure responsive means, said valve means being actuated to a closed position during an acceleration of the engine from a stabilized engine speed to a non-stabilized engine speed, said valve means being maintained in a closed position during a subsequent deceleration and reacceleration from said non-stabilized engine speed.

14. A system as claimed in claim 13 including means for varying the pressure drop across said fixed orifice as a function of engine speed, said valve means when closed acting to reduce said pressure drop to provide a corresponding decrease in fuel flow to the engine.

15. In a fuel system for a combustion engine having a burner, an air compressor and a characteristic range of unstable operation, the combination of a fuel conduit connected to deliver fuel to said burner, means responsive to a control fuel pressure operatively connected to said fuel conduit for controlling fuel flow therethrough to said burner in accordance with a predetermined fuel flow schedule, and fuel flow rescheduling means operatively connected to last named means for causing a variation in said predetermined fuel flow schedule over said characteristic range of unstable operation, said fuel flow rescheduling means comprising a conduit communicating said control fuel pressure with a source of drain fuel pressure, a valve member in said conduit for controlling fuel flow therethrough, first and second chambers separated by a pressure responsive member, a passage connecting said first chamber with a compressor generated air pressure, a restricted passage connecting said first and second chambers, resilient means operatively connected to said pressure responsive member for actuating said valve member to a closed position, said pressure responsive member being responsive to the pressure differential developed across said restricted passage in response to a decrease in said compressor generated air pressure resulting from a deceleration of said engine whereupon said valve member is actuated to an open position and said control fuel pressure is vented to drain fuel pressure, said pressure differential across said restricted passage acting to maintain said valve member in an open position for a predetermined interval of time during said deceleration and a subsequent reacceleration from a non-stabilized engine operating condition.

16. In a fuel system for a combustion engine having a burner and an air compressor, said engine having a characteristic range of unstable operation, the combination of a fuel conduit for supplying fuel to said burner, a fluid pump for pressurizing the fuel in said conduit, first and second valve means operatively connected to said conduit for controlling fuel flow therethrough, first pressure responsive means responsive to the pressure drop across said second valve operatively connected to said first valve means, a chamber partially defined by said first pressure responsive means, passage means connecting said chamber with a source of drain pressure, a normally closed valve member operatively connected to said passage means for controlling the flow therethrough, second pressure responsive means operatively connected to said valve member, first and second chambers oppositely disposed to said second pressure responsive means, a passage communicating said first chamber with a compressor generated air pressure, a restricted passage communicating said first and second chambers across which a pressure differential is developed in response to a decrease in said compressor generated pressure, resilient means for loading said pressure responsive means in a direction to close said valve member, said second pressure responsive means being loaded by the pressure differential across said restricted passage in a direction to open said valve member, said valve member being opened during a reacceleration through said characteristic range of unstable operation from a non-stabilized engine speed to effect a reduction in fuel flow to said burner.

References Cited in the file of this patent

UNITED STATES PATENTS

| | | |
|---|---|---|
| 2,422,808 | Stokes | June 24, 1947 |
| 2,599,507 | Wyckoff | June 3, 1952 |
| 2,654,995 | Ostroff | Oct. 13, 1953 |
| 2,667,743 | Lee | Feb. 2, 1954 |
| 2,670,599 | Davies et al. | Mar. 2, 1954 |
| 2,674,847 | Davies et al. | Apr. 13, 1954 |
| 2,757,511 | Jagger | Aug. 7, 1956 |
| 2,764,231 | Jubb | Sept. 25, 1956 |
| 2,780,055 | Bristol | Feb. 5, 1957 |

FOREIGN PATENTS

| | | |
|---|---|---|
| 664,807 | Great Britain | Jan. 9, 1952 |